(12) United States Patent
Hart et al.

(10) Patent No.: US 8,085,652 B2
(45) Date of Patent: Dec. 27, 2011

(54) COMMUNICATION SYSTEMS (75) Inventors: Michael John Beems Hart, London (GB); Yuefeng Zhou, Haywards Heath (GB)

(73) Assignee: Fujitsu Limited, Kawasaki (JP)

( * ) Notice: Subject to any disclaimer, the term of this patent is extended or adjusted under 35 U.S.C. 154(b) by 1053 days.

(21) Appl. No.: 11/840,621

(22) Filed: Aug. 17, 2007

(65) Prior Publication Data

US 2008/0043817 A1    Feb. 21, 2008

(30) Foreign Application Priority Data

Aug. 18, 2006 (GB) .................... 0616479.2

(51) Int. Cl.
*H04J 11/00* (2006.01)
*H04H 20/71* (2008.01)
*H04W 4/00* (2009.01)

(52) U.S. Cl. .................. 370/203; 370/312; 370/328

(58) Field of Classification Search .......... 370/203–211, 370/312–348; 375/130–150; 455/449–456.6
See application file for complete search history.

(56) References Cited

U.S. PATENT DOCUMENTS

| | | | |
|---|---|---|---|
| 5,719,868 | A | 2/1998 | Young |
| 6,370,384 | B1 | 4/2002 | Komara |
| 6,701,129 | B1 | 3/2004 | Hashem et al. |
| 7,096,274 | B1 | 8/2006 | Ci et al. |
| 2002/0080816 | A1 | 6/2002 | Spinar et al. |
| 2003/0054771 | A1 | 3/2003 | Chappaz |
| 2004/0005861 | A1 | 1/2004 | Tauchi |
| 2004/0100929 | A1 | 5/2004 | Garcia-Luna-Aceves |

(Continued)

FOREIGN PATENT DOCUMENTS

EP    0 151 280    12/1984

(Continued)

OTHER PUBLICATIONS

IEEE Std 802.16a-2003 (Amendment to IEEE Std 802.16-2001), IEEE Standard for Local and Metropolitan Area Networks Part 16: Air Interface for Fixed Broadband Wireless Access Systems—Amendment 2: Medium Access Control Modifications and Additional Physical Layer Specifications for 2-11 GHz, Apr. 2003, IEEE, pp. i, 115-116, 119, 156-158 and 182-183.*

(Continued)

*Primary Examiner* — Tri H Phan
(74) *Attorney, Agent, or Firm* — Baker Botts L.L.P.

(57) ABSTRACT

A transmission method for use in a multi-hop wireless communication system is provided. The system includes a source apparatus, a destination apparatus and two or more intermediate apparatuses. The system has access to a time-frequency format for use in assigning available transmission frequency bandwidth during a discrete transmission interval, said format defining a plurality of transmission windows within such an interval. Each window occupies a different part of that interval and has a frequency bandwidth profile within said available transmission frequency bandwidth over its part of that interval. Each said window is assignable for such a transmission interval to one of said apparatuses for use in transmission. The method for use in this system includes employing said format for one or more such transmission intervals to transmit information along at least three consecutive said links as a set of successive transmission signals, link by link, each said signal being transmitted in an available transmission window of said interval(s) and at least two of said signals being transmitted during the same said transmission interval such that said information is transmitted along said consecutive links in fewer transmission intervals than said number of consecutive links.

22 Claims, 7 Drawing Sheets

Example of Zone Usage Within One Cell

U.S. PATENT DOCUMENTS

| | | | |
|---|---|---|---|
| 2004/0109428 A1 | 6/2004 | Krishnamurthy | |
| 2005/0030887 A1 | 2/2005 | Jacobsen et al. | |
| 2005/0048914 A1 | 3/2005 | Sartori et al. | |
| 2006/0023745 A1 | 2/2006 | Koo et al. | |
| 2006/0256741 A1 | 11/2006 | Nozaki | |
| 2006/0264172 A1 | 11/2006 | Izumikawa et al. | |
| 2007/0060050 A1* | 3/2007 | Lee et al. | 455/13.1 |
| 2007/0081483 A1* | 4/2007 | Jang et al. | 370/315 |
| 2007/0217539 A1* | 9/2007 | Ihm et al. | 375/267 |
| 2008/0039107 A1* | 2/2008 | Ma et al. | 455/450 |
| 2008/0186950 A1* | 8/2008 | Zhu et al. | 370/350 |
| 2008/0188231 A1* | 8/2008 | Zhu et al. | 455/450 |
| 2008/0212512 A1* | 9/2008 | Harpek et al. | 370/315 |
| 2009/0129334 A1* | 5/2009 | Ma et al. | 370/331 |
| 2010/0110973 A1* | 5/2010 | Hart | 370/315 |
| 2010/0111027 A1* | 5/2010 | Hart | 370/329 |
| 2010/0128654 A1* | 5/2010 | Zhou et al. | 370/315 |

FOREIGN PATENT DOCUMENTS

| | | |
|---|---|---|
| EP | 1 324 509 | 7/2003 |
| EP | 1 617 693 | 1/2006 |
| EP | 1 635 592 | 3/2006 |
| EP | 1 677 443 | 7/2006 |
| EP | 1 804 430 A1 | 7/2007 |
| WO | WO 99/44341 | 9/1999 |
| WO | WO 01/76289 | 10/2001 |
| WO | WO 03/058984 | 7/2003 |
| WO | WO 2004/056013 | 7/2004 |
| WO | WO 2004/107693 | 12/2004 |
| WO | 2005/067173 | 7/2005 |
| WO | WO 2005/067173 | 7/2005 |
| WO | WO 2006/012554 | 2/2006 |
| WO | 2006/045499 | 5/2006 |
| WO | WO 2006/065069 | 6/2006 |
| WO | WO 2006/098608 | 9/2006 |
| WO | WO 2006/120161 | 11/2006 |

OTHER PUBLICATIONS

IEEE Std 802.16-2004 (Revision of IEEE Std 802.16-2001), IEEE Standard for Local and Metropolitan Area Networks Part 16: Air Interface for Fixed Broadband Wireless Access Systems, Oct. 2004, IEEE, pp. i, ii, iv, 164, 307, 496-501, 605 and 610.*

IEEE P802.16e/D12, Draft IEEE Standard for Local and Metropolitan Area Networks Part 16: Air Interface for Fixed Broadband Wireless Access Systems—Amendment for Physical and Medium Access Control Layers for Combined Fixed and Mobile Operation in Licensed Bands, Oct. 2005, IEEE, pp. i and 279-280.*

European Patent Office, European Search Report for Application No. EP 08 15 5435, Aug. 1, 2008, 8 pages.

European Patent Office, European Search Report for Application No. EP 07 11 3483, Sep. 26, 2007 6 pages.

IEEE Computer Society, IEEE Standard for Local and Metropolitan Area Networks, Part 16: Air Interface for Fixed Broadband Wireless Access Systems—Amendment 2: Medium Access Control Modifications and Additional Physical Layer Specifications for 2-11 GHz, Apr. 1, 2003, p. 1, 19, 68-70, and 80-87.

Hart et al., "Factors That Affect Performance of a Mobile Multihop Relay System," IEEE 802.16 Presentation Submission Template (Rev.8.3), Sep. 13, 2005, 19 pages.

Relay Task Group of IEEE 802.16, "Part 16: Air Interface for Fixed and Mobile Broadband Wireless Access Systems," Multihop Relay Specification, p. 1-12 and 78-104, Jun. 6, 2007.

Communication from the European Patent Office, European Search Report for Application No. EP 07 11 3538, Dec. 27, 2007, 7 pages.

Communication from the European Patent Office, European Search Report for Application No. EP 07113557.8-1525, Dec. 3, 2007, 7 pages.

The Patent Office, Search Report under Section 17, U.K. Application No. GB0616482, date of search Oct. 27, 2006, 1 page.

The Patent Office, Search Report under Section 17, U.K. Application No. GB0616471, date of search Oct. 27, 2006, 1 page.

The Patent Office, Search Report under Section 17, U.K. Application No. GB0616477, date of search Oct. 27, 2006, 1 page.

The Patent Office, Search Report under Section 17, U.K. Application No. GB0616472, date of search Nov. 3, 2006, 1 page.

The Patent Office, Search Report under Section 17, U.K. Application No. 0616479, date of search Oct. 27, 2006, 1 page.

The Patent Office, Search Report under Section 17, U.K. Application No. 0622124, date of search Dec. 7, 2006, 1 page.

The Patent Office, Search Report under Section 17, U.K. Application No. 0622122, date of search Nov. 28, 2006, 1 page.

IEEE Computer Society, "IEEE Standards for Information Technology, 803.11g™," Part 11: Wireless LAN Medium Access Control (MAC) and Physical Layer (PHY) Specifications, Amendment 4: Further Higher Data Rate Extension in the 2.4 GHz Band, Jun. 27, 2003, 78 pages.

Hart et al., "Relay Midamble," IEEE 802.16 Broadband Wireless Access Working Group <http://ieee802.org/16>, pp. 0-3, Nov. 6, 2006.

Hart et al., "Frame Structure for Multihop Relaying Support," IEEE 802.16 Broadband Wireless Access Working Group < http://ieee802.org/16>, IEE C80216j/138, ieee 802.16 meeting #46, pp. 0-9, Nov. 2006.

Hart et al., >, "TDD MR Frame Structure," IEEE 802.16 Broadband Wireless Access Working Group < http://ieee802.org/16>, pp. 1-10, Oct. 20, 2006.

Hart, "Dimensioning and System Level Analysis of an HSDPA Network with Relaying Nodes," 5 pages, 2005.

Chu, "Polyphase Codes with Good Periodic Correlation Properties," IEEE Transactions on Information Theory, Jul. 1972, pp. 531-532.

Frank et al., "Phase Shift Pulse Codes with Good Periodic Correlation Properties," IRE Transactions on Information Theory, pp. 381-382, Oct. 1962.

Milewski, "Periodic Sequences with Optimal Properties for Channel Estimation and Fast Start-Up Equalization," IBM Research and Development Journal, pp. 426-431 Sep. 1983.

Hart, "Optimal Transmit Power Balancing in Multi-Hop Networks," Fujitsu Laboratories of Europe, Ltd., 6 pages, 2005.

Golay, "Multi-Slit Spectrometry," Journal of the Optical Society of America, vol. 39, No. 6, pp. 437-444, Jun. 1949.

Golay, "Complementary Series," IRE Transactions on Information Theory, IT 7, pp. 82-87, Apr. 1961.

Zhou et al., "Communication Systems," Pending U.S. Appl. No. 11/840,492, filed Aug. 17, 2007.

Zhou et al., "Communication Systems," Pending U.S. Appl. No. 11/840,518, filed Aug. 17, 2007.

Hart et al., "Communication Systems," Pending U.S. Appl. No. 11/840,546, filed Aug. 17, 2007.

Hart et al., "Communication Systems," Pending U.S. Appl. No. 11/840,570, filed Aug. 17, 2007.

Zhou et al., "Communication Systems," Pending U.S. Appl. No. 11/840,595, filed Aug. 17, 2007.

Hart et al., "Communication Systems," Pending U.S. Appl. No. 11/840,621, filed Aug. 17, 2007.

Hart et al., "Communication Systems," Pending U.S. Appl. No. 11/840,644, filed Aug. 17, 2007.

Hart et al., "Communication Systems," Pending U.S. Appl. No. 11/840,669, filed Aug. 17, 2007.

Hart et al., "Communication Systems," Pending U.S. Appl. No. 11/840,429, filed Sep. 7, 2007.

Hart et al., "Communication Systems," Pending U.S. Appl. No. 11/840,430, filed Sep. 7, 2007.

Hart et al., "Wireless Communication Systems," Pending U.S. Appl. No. 11/856,139, filed Sep. 17, 2007.

Hart et al., "Wireless Communication Systems," Pending U.S. Appl. No. 11/856,145, filed Sep. 17, 2007.

Hart et al., "Communication Systems," Pending U.S. Appl. No. 11/856,178, filed Sep. 17, 2007.

Fang-Ching et al.;"Recommendation on PMP Mode Compatible TDD Frame Structure"; IEEE C802.16mmr-05/027rl; pp. 16, Sep. 9, 2005.

Shen et al.;"Recommendation on IEEE 8023.16j"; IEEE C802.16jr-06/004rl; pp. 14, May 8, 2006.

Extended European Search Report; Application No. 07113531.3-2412 / 1890416; pp. 4, Apr. 19, 2010.

Extended European Search Report; Application No. 09179735.7-2412 / 2178325; pp. 4, Apr. 19, 2010.

Extended European Search Report; Application No. 09173854.2-2412 / 2146463; pp. 4, Apr. 19, 2010.

IEEE; "Multi-hop System Evaluation Methodology (Channel model and Performance Metric)"; 802.16 Broadband Wireless Access Working Group; pp. 35, Jun. 20, 2006.

Communication from the European Patent Office, European Search Report for Application No. EP 08 15 8421, Oct. 21, 2008, 1 pages.

Communication from the European Patent Office, European Search Report for Application No. EP 07 11 3481, Oct. 19, 2007, 1 pages, Oct. 21, 2008.

Kaneko et al., "Proposed Relay Method with P-MP Structure of IEEE802.16/2004," 2005 IEEE 16th International Symposium on Personal, Indoor and Mobile Radio Communications, pp. 1606-1610, Sep. 11, 2005 through Sep. 14, 2005.

Hoymann et al., "Multihop Communication in Relay Enhanced IEEE 802.16 Networks," The 17th Annual IEEE International Symposium on Personal, Indoor and Mobile Radio Communications, 5 pages, Sep. 1, 2006.

Etri et al, Transmission of IP Packets over Ethernet over IEEE 802.16, draft-riegel-16ng-ip-over-eth-over-80216-01.txt, Oct. 1, 2006, pages 1-16.

Kim et al., Fair and Efficient Multihop Scheduling Algorithm for IEEE 802.16 BWA Systems, pp. 895-901, Oct. 3-7, 2005.

European Office Action; Application No. 07 113 552.9-2412; pp. 14, Dec. 9, 2010.

IEEE 802.16; "Recommendation on PMP Mode Compatible TDD Frame Structure"; XP-002575192; pp. 16, Sep. 9, 2005.

* cited by examiner

Fig.1

Frame Structure

Fig.2

Node Activity Within Each Zone

Fig.3

Example of Zone Usage Within One Cell

Example TDD frame structure from OFDMA physical layer of the IEEE802.16 standard

PRIOR ART

COMMUNICATION SYSTEMS

RELATED APPLICATION

This application claims foreign priority benefits under 35 U.S.C. §119 of United Kingdom Application No. GB 0616479.2, filed on Aug. 18, 2006, entitled "Communication Systems".

CROSS-REFERENCE TO RELATED APPLICATIONS

This application relates to the following applications, each of which is incorporated herein by reference:
COMMUNICATION SYSTEMS, application Ser. No. 11/840,492, filed Aug. 17, 2007 and currently pending;
COMMUNICATION SYSTEMS, application Ser. No. 11/840,518, filed Aug. 17, 2007 and currently pending;
COMMUNICATION SYSTEMS, application Ser. No. 11/840,546, filed Aug. 17, 2007and currently pending;
COMMUNICATION SYSTEMS, application Ser. No. 11/840,570, filed Aug. 17, 2007and currently pending;
COMMUNICATION SYSTEMS, application Ser. No. 11/840,595, filed Aug. 17, 2007and currently pending;
COMMUNICATION SYSTEMS, application Ser. No. 11/840,644, filed Aug. 17, 2007and currently pending;
COMMUNICATION SYSTEMS, United Kingdom Application No. GB 0616478.4, filed on Aug. 18, 2006;
COMMUNICATION SYSTEMS, United Kingdom Application No. GB 0616475.0, filed on Aug. 18, 2006; and
COMMUNICATION SYSTEMS, United Kingdom Application No. GB 0616476.8, filed on Aug. 18, 2006.

TECHNICAL FIELD

This invention relates in general to communication systems, and more particularly to a frame structure for a multi-hop communication system.

OVERVIEW

Currently there exists interest in the use of multihop techniques in packet based radio and other communication systems, where it is purported that such techniques will enable both extension in coverage range and increase in system capacity (throughput).

Figure 4:
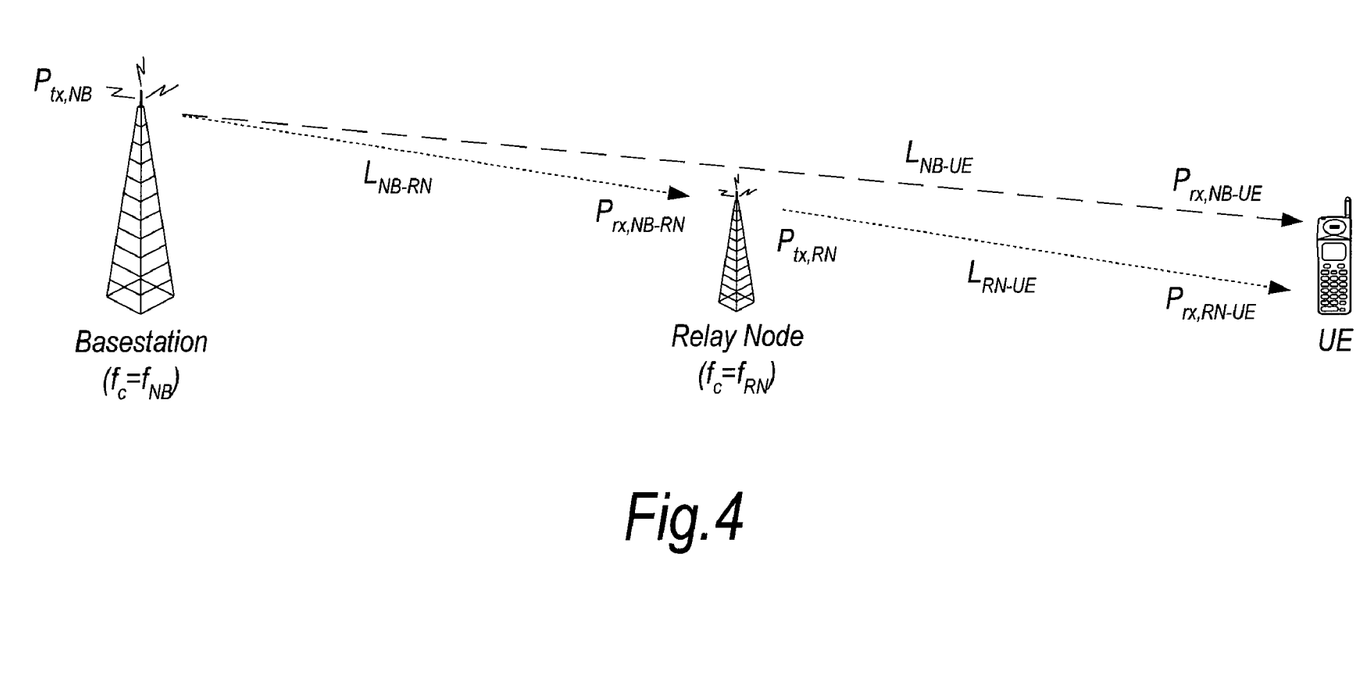
FIG. 4 shows a single-cell two-hop wireless communication system.

In a multi-hop communication system, communication signals are sent in a communication direction along a communication path (C) from a source apparatus to a destination apparatus via one or more intermediate apparatuses. FIG. 4 illustrates a single-cell two-hop wireless communication system comprising a base station BS (known in the context of 3G communication systems as "node-B" NB) a relay node RN (also known as a relay station RS) and a user equipment UE (also known as mobile station MS). In the case where signals are being transmitted on the downlink (DL) from a base station to a destination user equipment (UE) via the relay node (RN), the base station comprises the source station (S) and the user equipment comprises the destination station (D). In the case where communication signals are being transmitted on the uplink (UL) from a user equipment (UE), via the relay node, to the base station, the user equipment comprises the source station and the base station comprises the destination station. The relay node is an example of an intermediate apparatus (I) and comprises: a receiver, operable to receive data from the source apparatus; and a transmitter, operable to transmit this data, or a derivative thereof, to the destination apparatus.

Simple analogue repeaters or digital repeaters have been used as relays to improve or provide coverage in dead spots. They can either operate in a different transmission frequency band from the source station to prevent interference between the source transmission and the repeater transmission, or they can operate at a time when there is no transmission from the source station.

Figure 5A:
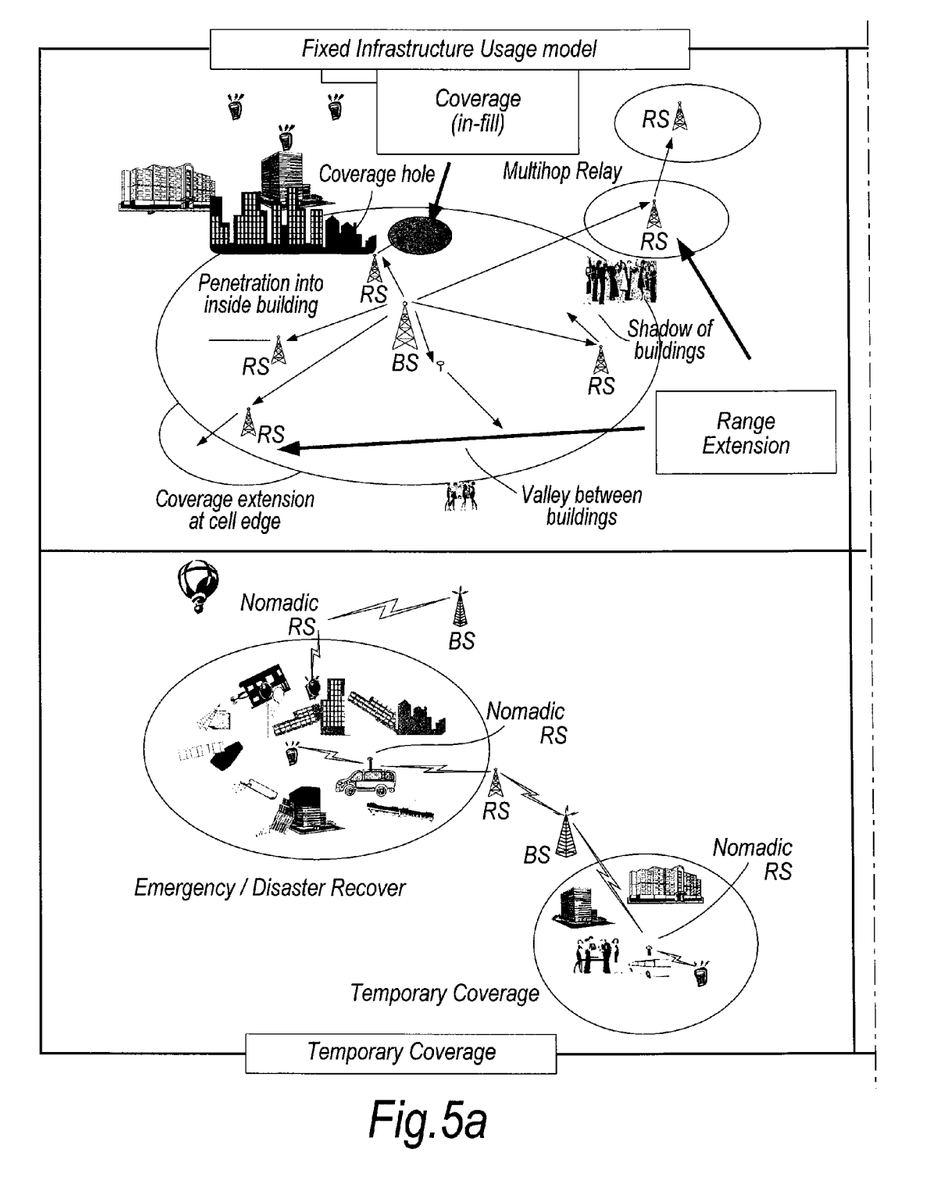
FIGS. 5a and 5b show applications of relay stations.
Figure 5B:
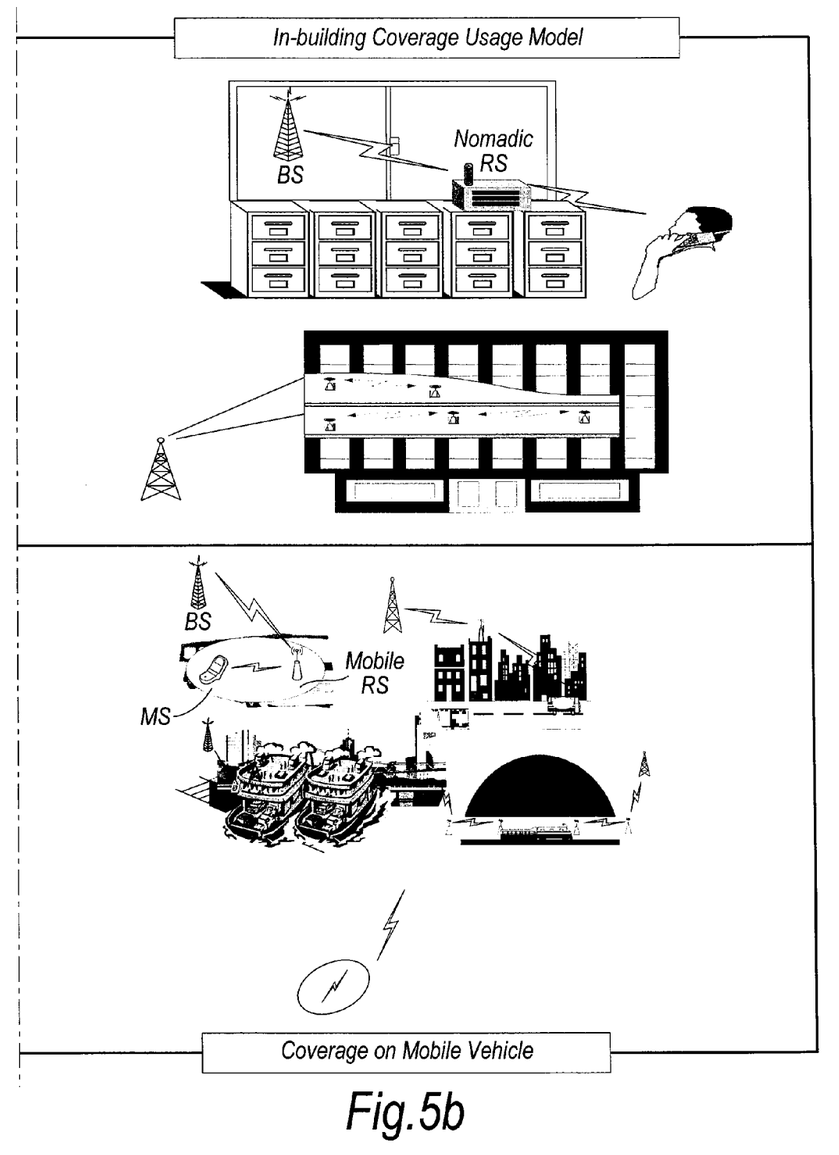

FIGS. 5a-b illustrates a number of applications for relay stations. For fixed infrastructure, the coverage provided by a relay station may be "in-fill" to allow access to the communication network for mobile stations which may otherwise be in the shadow of other objects or otherwise unable to receive a signal of sufficient strength from the base station despite being within the normal range of the base station. "Range extension" is also shown, in which a relay station allows access when a mobile station is outside the normal data transmission range of a base station. One example of in-fill shown at the top right of FIGS. 5a-b is positioning of a nomadic relay station to allow penetration of coverage within a building that could be above, at, or below ground level.

Other applications are nomadic relay stations which are brought into effect for temporary cover, providing access during events or emergencies/disasters. A final application shown in the bottom right of FIGS. 5a-b provides access to a network using a relay positioned on a vehicle.

Relays may also be used in conjunction with advanced transmission techniques to enhance gain of the communications system as explained below.

It is known that the occurrence of propagation loss, or "pathloss", due to the scattering or absorption of a radio communication as it travels through space, causes the strength of a signal to diminish. Factors which influence the pathloss between a transmitter and a receiver include: transmitter antenna height, receiver antenna height, carrier frequency, clutter type (urban, sub-urban, rural), details of morphology such as height, density, separation, terrain type (hilly, flat). The pathloss L (dB) between a transmitter and a receiver can be modeled by:

$$L = b + 10n\log d \qquad (A)$$

Where d (meters) is the transmitter-receiver separation, b(db) and n are the pathloss parameters and the absolute pathloss is given by $l = 10^{(L/10)}$.

The sum of the absolute path losses experienced over the indirect link SI +ID may be less than the pathloss experienced over the direct link SD. In other words it is possible for:

$$L(SI) + L(ID) < L(SD) \qquad (B)$$

Splitting a single transmission link into two shorter transmission segments therefore exploits the non-linear relationship between pathloss verses distance. From a simple theoretical analysis of the pathloss using equation (A), it can be appreciated that a reduction in the overall pathloss (and therefore an improvement, or gain, in signal strength and thus data throughput) can be achieved if a signal is sent from a source apparatus to a destination apparatus via an intermediate apparatus (e.g. relay node), rather than being sent directly from the source apparatus to the destination apparatus. If implemented appropriately, multi-hop communication systems can allow for a reduction in the transmit power of transmitters which facilitate wireless transmissions, leading to a reduction in interference levels as well as decreasing exposure to electromagnetic emissions. Alternatively, the reduction in overall pathloss can be exploited to improve the received signal quality at the receiver without an increase in the overall radiated transmission power required to convey the signal.

Multi-hop systems are suitable for use with multi-carrier transmission. In a multi-carrier transmission system, such as FDM (frequency division multiplex), OFDM (orthogonal frequency division multiplex) or DMT (discrete multi-tone), a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to channel induced distortion compared with single carrier systems. This is made possible by ensuring that the transmission rate and hence bandwidth of each subcarrier is less than the coherence bandwidth of the channel. As a result, the channel distortion experienced on a signal subcarrier is frequency independent and can hence be corrected by a simple phase and amplitude correction factor. Thus the channel distortion correction entity within a multicarrier receiver can be of significantly lower complexity of its counterpart within a single carrier receiver when the system bandwidth is in excess of the coherence bandwidth of the channel.

Orthogonal frequency division multiplexing (OFDM) is a modulation technique that is based on FDM. An OFDM system uses a plurality of sub-carrier frequencies which are orthogonal in a mathematical sense so that the sub-carriers' spectra may overlap without interference due to the fact they are mutually independent. The orthogonality of OFDM systems removes the need for guard band frequencies and thereby increases the spectral efficiency of the system. OFDM has been proposed and adopted for many wireless systems. It is currently used in Asymmetric Digital Subscriber Line (ADSL) connections, in some wireless LAN applications (such as WiFi devices based on the IEEE 802.11a/g standard), and in wireless MAN applications such as WiMAX (based on the IEEE 802.16 standard). OFDM is often used in conjunction with channel coding, an error correction technique, to create coded orthogonal FDM or COFDM. COFDM is now widely used in digital telecommunications systems to improve the performance of an OFDM based system in a multipath environment where variations in the channel distortion can be seen across both subcarriers in the frequency domain and symbols in the time domain. The system has found use in video and audio broadcasting, such as DVB and DAB, as well as certain types of computer networking technology.

In an OFDM system, a block of N modulated parallel data source signals is mapped to N orthogonal parallel sub-carriers by using an Inverse Discrete or Fast Fourier Transform algorithm (IDFT/IFFT) to form a signal known as an "OFDM symbol" in the time domain at the transmitter. Thus, an "OFDM symbol" is the composite signal of all N sub-carrier signals. An OFDM symbol can be represented mathematically as:

$$x(t) = \frac{1}{\sqrt{N}} \sum_{n=0}^{N-1} c_n \cdot e^{j2\pi n \Delta f t}, \quad 0 \le t \le T_s \quad (1)$$

where $\Delta f$ is the sub-carrier separation in Hz, $T_s = 1/\Delta f$ is symbol time interval in seconds, and $c_n$ are the modulated source signals. The sub-carrier vector in (1) onto which each of the source signals is modulated $c \in C_n$, $c = (c_0, c_1 \ldots c_{N-1})$ is a vector of N constellation symbols from a finite constellation. At the receiver, the received time-domain signal is transformed back to frequency domain by applying Discrete Fourier Transform (DFT) or Fast Fourier Transform (FFT) algorithm.

OFDMA (Orthogonal Frequency Division Multiple Access) is a multiple access variant of OFDM. It works by assigning a subset of sub-carriers, to an individual user. This allows simultaneous transmission from several users leading to better spectral efficiency. However, there is still the issue of allowing bi-directional communication, that is, in the uplink and download directions, without interference.

In order to enable bi-directional communication between two nodes, two well known different approaches exist for duplexing the two (forward or download and reverse or uplink) communication links to overcome the physical limitation that a device cannot simultaneously transmit and receive on the same resource medium. The first, frequency division duplexing (FDD), involves operating the two links simultaneously but on different frequency bands by subdividing the transmission medium into two distinct bands, one for forward link and the other for reverse link communications. The second, time division duplexing (TDD), involves operating the two links on the same frequency band, but subdividing the access to the medium in time so that only the forward or the reverse link will be utilizing the medium at any one point in time. Both approaches (TDD & FDD) have their relative merits and are both well used techniques for single hop wired and wireless communication systems. For example the IEEE 802.16 standard incorporates both an FDD and TDD mode.

Figure 6:
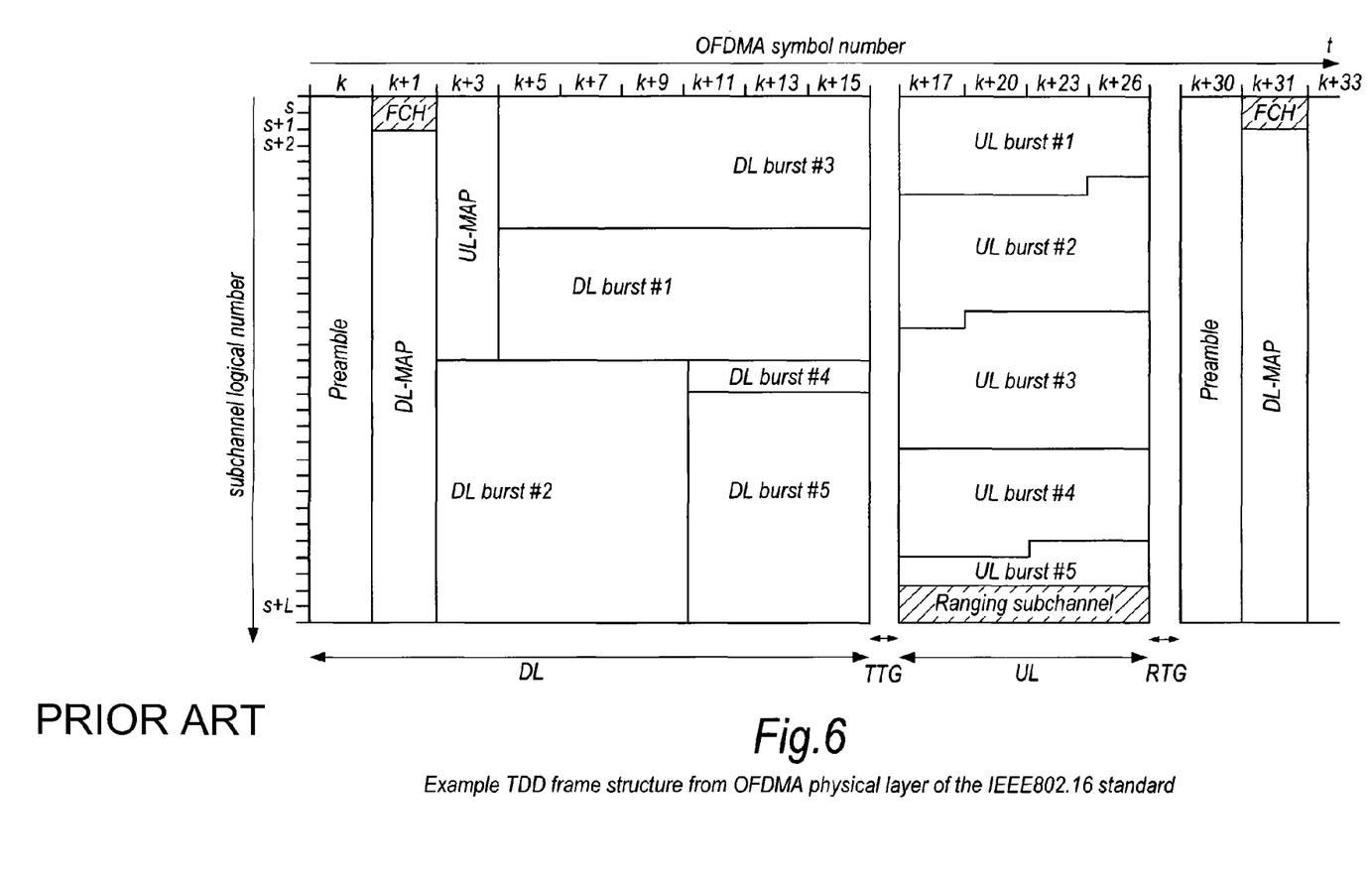
FIG. 6 shows a single hop TDD frame structure used in the OFDMA physical layer mode of the IEEE 802.16 standard.

As an example, FIG. 6 illustrates the single hop TDD frame structure used in the OFDMA physical layer mode of the IEEE 802.16 standard (WiMAX). Each frame is divided into DL and UL subframes, each being a discrete transmission interval. They are separated by Transmit/Receive and Receive/Transmit Transition Guard interval (TTG and RTG respectively). Each DL subframe starts with a preamble followed by the Frame Control Header (FCH), the DL-MAP, and the UL-MAP. The FCH contains the DL Frame Prefix (DLFP) to specify the burst profile and the length of the DL-MAP. The DLFP is a data structure transmitted at the beginning of each frame and contains information regarding the current frame; it is mapped to the FCH.

Simultaneous DL allocations can be broadcast, multicast and unicast and they can also include an allocation for another BS rather than a serving BS. Simultaneous ULs can be data allocations and ranging or bandwidth requests.

SUMMARY OF EXAMPLE EMBODIMENTS

A transmission method for use in a multi-hop wireless communication system is provided. The system includes a source apparatus, a destination apparatus and two or more intermediate apparatuses. The source apparatus is operable to transmit information along a series of links forming a communication path extending from the source apparatus to the destination apparatus via each intermediate apparatus. Each intermediate apparatus is operable to receive information from a previous apparatus along the path and to transmit the received information to a subsequent apparatus along the path. The system has access to a time-frequency format for use in assigning available transmission frequency bandwidth during a discrete transmission interval, said format defining a plurality of transmission windows within such an interval. Each window occupies a different part of that interval and has a frequency bandwidth profile within said available transmission frequency bandwidth over its part of that interval. Each said window is assignable for such a transmission interval to one of said apparatuses for use in transmission. The method for use in this system includes employing said format for one or more such transmission intervals to transmit information along at least three consecutive said links as a set of successive transmission signals, link by link, each said signal being transmitted in an available transmission window of said interval(s) and at least two of said signals being transmitted during the same said transmission interval such that said information is transmitted along said consecutive links in fewer transmission intervals than said number of consecutive links.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

When a node is required to support two independent links to two different nodes, e.g. a relay station communicating with a base station and a mobile, the existing TDD or FDD frame structures require some modification in order to make realization of the relay practical. Particular embodiments provide a frame structure for a multihop communication system that is an extension of the standard TDD frame structure (see IEEE 802.16 standard for an example) that provides support for any number of hops in the system.

Details of the Preferred Frame Structure and System Operation

One proposed frame structure makes the assumption that the control information originating from the head node that controls the overall medium access is receivable by all subordinate nodes operating in the network. Also it is assumed that the modified frame TDD structure should be able to enable legacy mobile devices that have no knowledge of a relay station to operate within the system.

Figure 1:
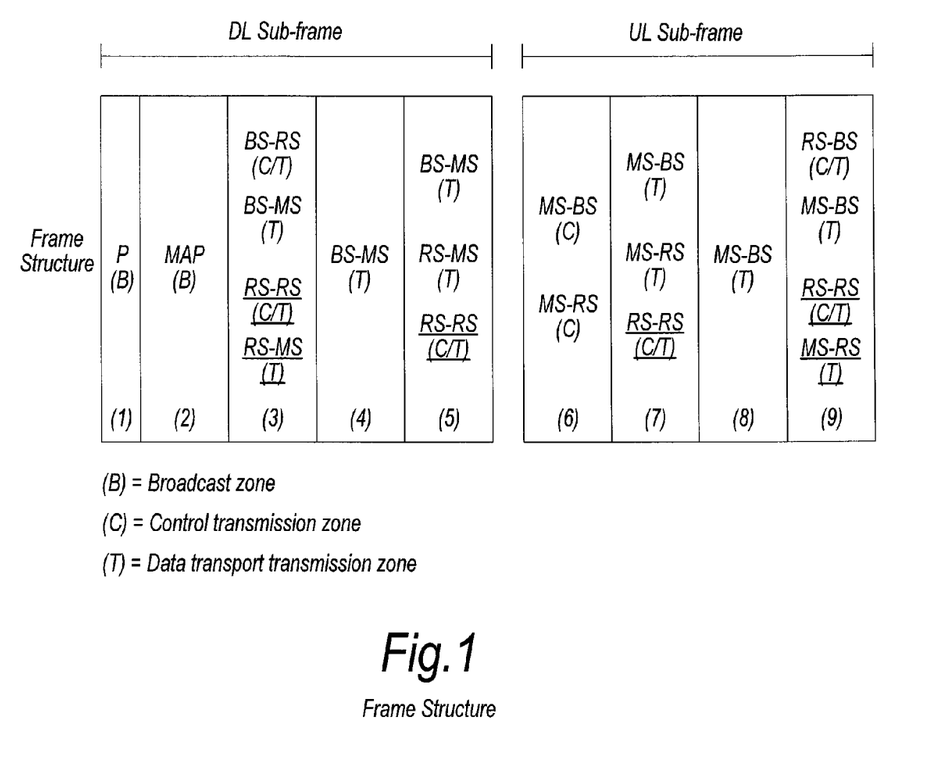
FIG. 1 shows a frame structure.

The proposed generic TDD frame structure is shown in FIG. 1. It is composed of a number of transmission and reception zones for both the downlink and uplink sub-frames. The zone types are either:

B Broadcast of control related information such as: synchronization sequences, commands, information and details of the structure or layout of the frame.

C Dedicated control information that is transmitted in a non-broadcast zone (i.e. either to individual or a group of receivers)

T Dedicated user-data transmission

The 9 different zones are described in Table 1.

TABLE 1

Description of the zones.

| Zone Number | Label | Description |
|---|---|---|
| 1 | P | Preamble or synchronization sequence transmissions for cell identification |
| 2 | MAP | Frame format description (zone boundaries, allocations within the zones, etc) |
| 3 | BS-RS/BS-MS/RS-RS/MS | BS to RS transmission zone. Can also be used for BS to MS transmission if spatial division multiple access is supported (i.e. the same transmission resource can be used to communicate with more than one entity). Can also be used for RS to RS or MS transmission. |
| 4 | BS-MS | BS to MS transmission zone. RS is not active during this period, it is processing any received information and turning around prior to transmission. |
| 5 | BS-MS/RS-RS/MS | RS to RS or MS transmission zone. Can also be used by the BS to transmit to MSs that do not experience significant levels of interference from RS transmissions. |
| 6 | MS-BS/MS-RS | MS control information transmission zone. Information can be received by both the RS and the BS. Control information can be information or requests from the MS. |
| 7 | MS-BS/ MS/RS-RS | MS or RS to RS transmission zone. Can also be used by MSs who do not cause interference to the RS to transmit to the BS. |
| 8 | MS-BS | MS to BS transmission zone. RS is not actively transmitting or receiving during this period; it is processing any received information prior to turning around. |
| 9 | RS-BS/MS-BS/MS/RS-RS | RS to BS transmission zone. Can also be used for MS to BS transmission if spatial division multiple access is supported (i.e. the same transmission resource can be used to communicate with more than one entity). Can also be used for MS or RS to RS communication. |

Figure 2:
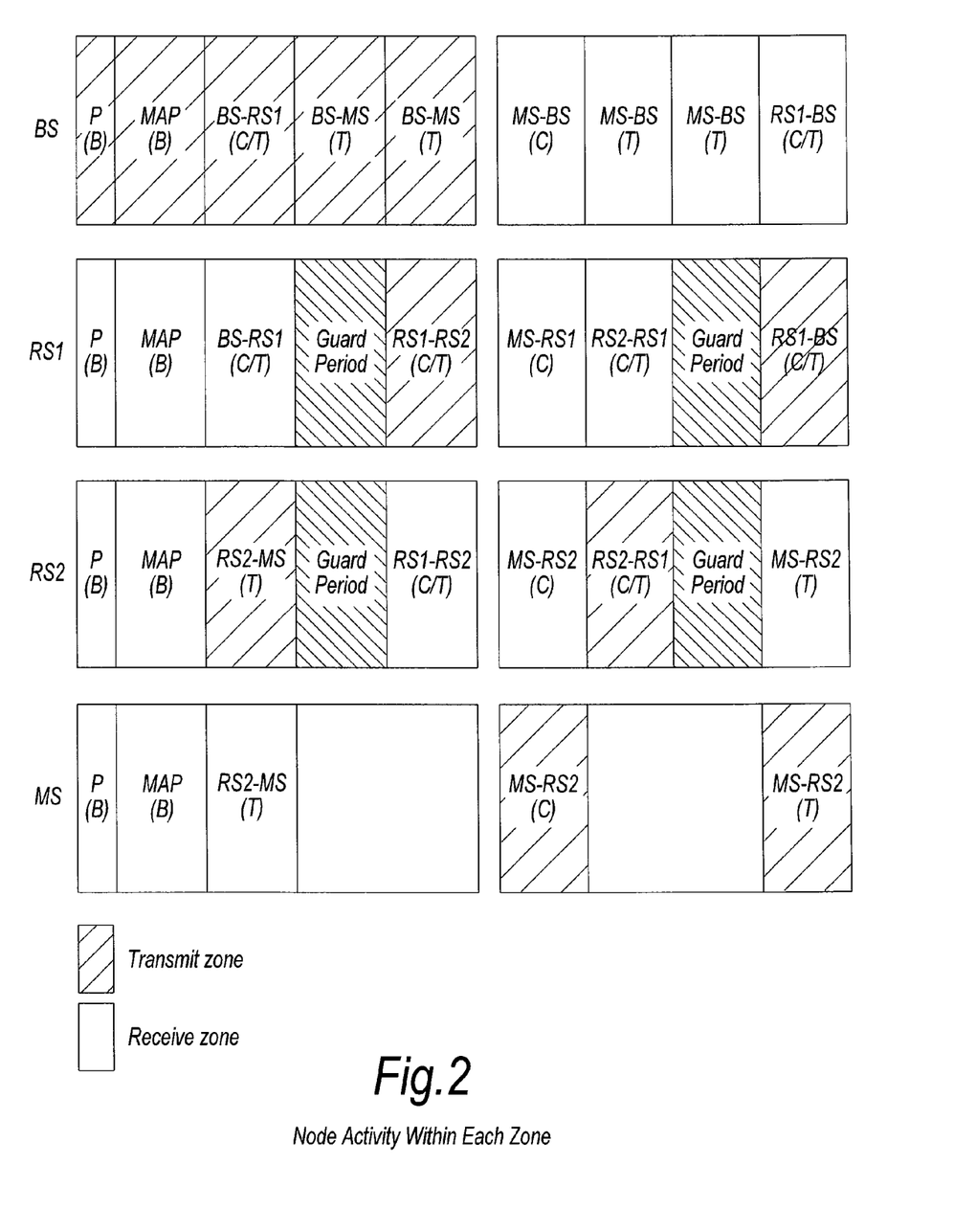
FIG. 2 shows node activity within each zone.

FIG. 2 illustrates the operation of the BS, RS and MS in terms of its activity within each of the zones described in Table 1 when the MS is connected to the BS via two RSs (RS1 & RS2). Note that RS1 uses zones (5) and (7) to communicate with RS2 as zones (3) and (9) are used to communicate with the BS. Also this approach enables the possibility of performing relaying of information across the first hop within the same frame. RS2 then makes use of zones (3) and (9) to communication with any MSs (or further RS). If a third RS existed (RS3), then it would use zones (5) and (7) to communicate with any MSs or further RSs.

Note that relaying across the first two hops occurs within one frame. However, relaying over three hops introduces an extra frame delay. In the general case of N hops, it is found that the extra latency introduced through relaying is given by the following expression:

$$L_{relay}(\text{frames}) = \text{floor}(N_{hops} - \tfrac{1}{2}) \qquad (1)$$

Figure 3:
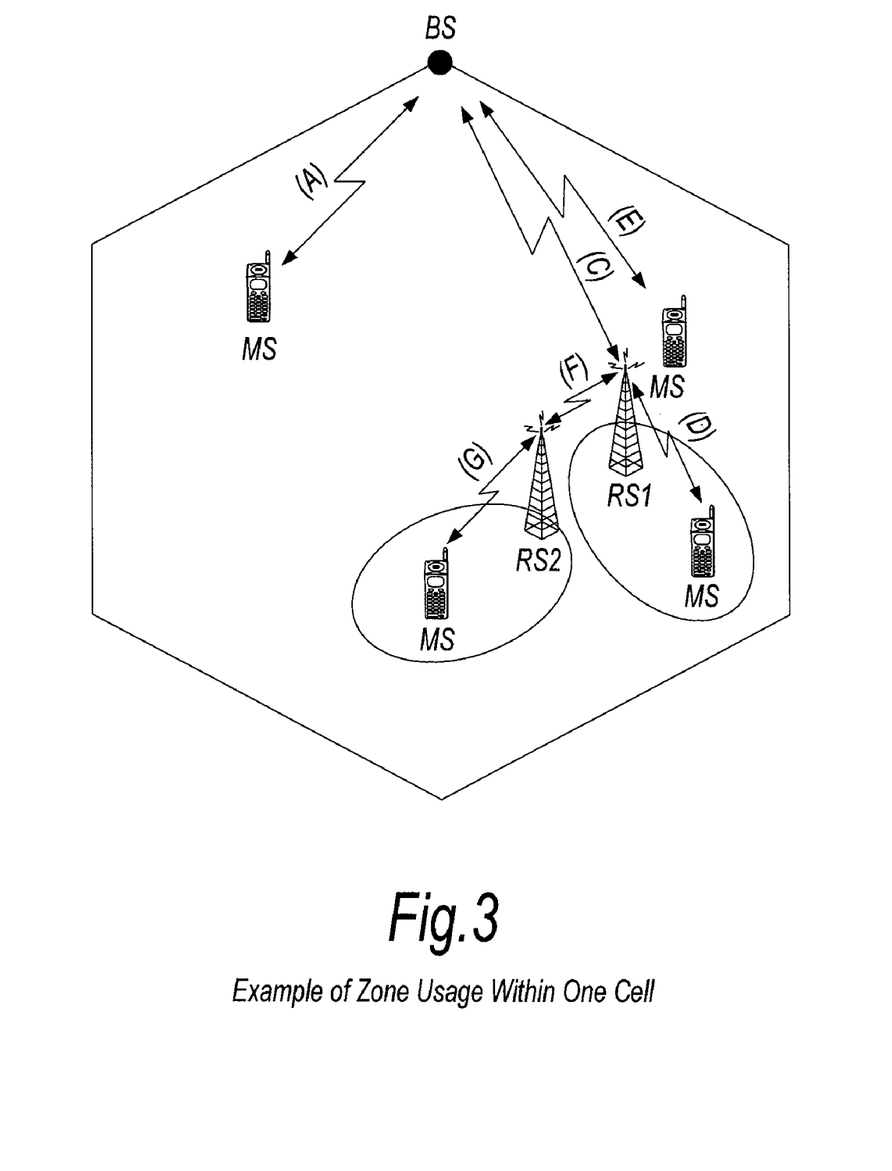
FIG. 3 shows an example of zone usage within one cell.

FIG. 3 indicates one particular realization of the proposed frame structure in terms of how different user types may be allocated to the various zone types. In this case there are six link types identified (A, C-G). A description of the zones used on each link in this example is given in Table 2.

TABLE 2

Description of example of zone usage within one cell.

| Link | DL Zone Usage | UL Zone Usage | Comments |
|------|---------------|---------------|----------|
| (A) | (1), (2), (5) | (6), (7) | MS and RS are spatially separated and therefore significant interference isolation exists. |
| (C) | (1), (2), (3), (5) | (6), (7), (9) | RS1 receives data in (3) and (7) and then transmits in (5) and (9). |
| (D) | (1), (2), (5) | (6), (7) | MS communicates with BS via RS1. Transmission to the RS happens at the beginning of the UL subframe to allow sufficient RS relay processing time. |
| (E) | (1), (2), (4) | (6), (8) | MSs that communicate directly with the BS that are not isolated from the RS use zones (4) & (8) to prevent RS interference from impairing link performance. |
| (F) | (1), (2), (5) | (6), (7) | RS1 and RS2 communicate using the same zones that RS1 uses to communicate with the MSs connected via RS1. |
| (G) | (1), (2), (3) | (6), (9) | RS2 communicates with MS using zones (3) and (9). |

In summary, the benefits of particular embodiments may include:

Enabling the construction and operation of simple, low cost relays that do not need to generate any control information or perform scheduling Maximizing spectral efficiency by making sure that the BS does not have any time in the frame when it is idle Minimal latency: latency in units of frames is 0 for 1 or 2 hops, 1 for 3 or 4 hops, 2 for 5 or 6 hops, 3 for 7 or 8 hops, etc.

Enabling the system to potentially provide transparent operation to a legacy single-hop TDD user The possibility to further improve spectral efficiency through using SDMA based techniques to enable the same transmission resource (frequency & time) to be used between the BS and the RSs and MSs within a cell.

Are extendable to any number of hops

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of a transmitter embodying the present invention. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A transmission method for use in a multi-hop wireless communication system, the system comprising a source apparatus, a destination apparatus and two or more intermediate apparatuses, said source apparatus being operable to transmit information along a series of links forming a communication path extending from the source apparatus to the destination apparatus via each intermediate apparatus, and each intermediate apparatus being operable to receive information from a previous apparatus along the path and to transmit the received information to a subsequent apparatus along the path, the system having access to a time-frequency format for use in assigning available transmission frequency bandwidth during a sub-frame period, said format defining a plurality of transmission windows within such sub-frame period, each window occupying a different part of that sub-frame period and having a frequency bandwidth profile within said available transmission frequency bandwidth over its part of that sub-frame period, each said window being assignable for such a sub-frame period to one of said apparatuses for use in transmission, the format including a particular transmission window and a subsequent transmission window and the method comprising:

employing said format for more than one such sub-frame period to transmit information along at least three consecutive said links as a set of successive transmission signals, link by link, each said signal being transmitted in an available transmission window of said sub-frame period;

the method further comprising:

prior to said transmission, employing said format:

to assign the particular transmission window of a first sub-frame period to a first said apparatus along said consecutive links for transmission of the information to a second said apparatus one link along the path from the first apparatus, to assign the subsequent transmission window of the first sub-frame period to the second apparatus for transmission of the information to a third said apparatus one link along the path from the second apparatus, and to assign the particular transmission window of a second sub-frame period being the next such sub-frame period after said first sub-frame period to said third apparatus for transmission of the information to a fourth said apparatus one link along the path from the third apparatus.

2. The transmission method according to claim 1, wherein the frequency bandwidth profiles of at least two of said transmission windows encompass a common part of the available transmission frequency bandwidth.

3. The transmission method according to claim 1, wherein the frequency bandwidth profiles of at least two said transmission windows extend over substantially the entire transmission frequency bandwidth for the respective subframe parts.

4. The transmission method according to claim 1, wherein at least two of said signals are transmitted during the same said sub-frame period such that said information is transmitted along said consecutive links in fewer sub-frame periods than said number of consecutive links.

5. The transmission method according to claim 4, wherein the system comprises at least three said intermediate apparatuses, the method further comprising, prior to said transmission, employing said format to assign the subsequent transmission window of the second sub-frame period to the fourth apparatus for transmission of the information to a fifth said apparatus along said consecutive links being a subsequent said apparatus one link along the path from the fourth apparatus.

6. The transmission method according to claim 4, wherein said particular and subsequent transmission windows of said first sub-frame period are either side in time of a further transmission window of the first sub-frame period and wherein said particular and subsequent transmission windows of said second sub-frame period are either side in time of a further transmission window of the second sub-frame period.

7. The transmission method according to claim 6, further comprising:
   performing processing in said second apparatus, during the part of the sub-frame period corresponding to the further transmission window of the first sub-frame period, so as to configure the information for transmission in the subsequent transmission window of the first sub-frame period based upon the information received in the particular transmission window of the first sub-frame period; and
   performing processing in said fourth apparatus, during the part of the sub-frame period corresponding to the further transmission window of the second sub-frame period, so as to configure the information for transmission in the subsequent transmission window of the second sub-frame period based upon the information received in the particular transmission window of the second sub-frame period.

8. The transmission method according to claim 1, wherein said communication path is an indirect communication path, and wherein the system comprises at least a further destination apparatus, and wherein said source apparatus or any said intermediate apparatus is operable to transmit information directly to the or each further destination apparatus along a corresponding single link forming a direct communication path.

9. The transmission method according to claim 1, comprising employing a space division multiple access technique in one or more of said transmission windows of said sub-frame period.

10. The transmission method according to claim 1, wherein the time-frequency format is a format for a downlink or uplink sub-frame in a time-division-duplex communication system.

11. The transmission method according to claim 1, wherein said system is an OFDM or OFDMA system, and wherein the time-frequency format is a format for an OFDM or OFDMA downlink or uplink sub-frame of an OFDM or OFDMA time-division-duplex frame.

12. The transmission method according to claim 1, wherein each said transmission window comprises a region in an OFDM or OFDMA frame structure.

13. The transmission method according to claim 1, wherein each said transmission window comprises a zone in an OFDM or OFDMA frame structure.

14. The transmission method according to claim 1, wherein said source apparatus is a base station.

15. The transmission method according to claim 1, wherein said source apparatus is a user terminal.

16. The transmission method according to claim 1, wherein the or each destination apparatus is a base station.

17. The transmission method according to claim 1, wherein the or each destination apparatus is a user terminal.

18. The transmission method according to claim 1, wherein each said intermediate apparatus is a relay station.

19. A suite of computer programs embodied in a non-transitory computer-readable medium which, when executed on computing devices of a multi-hop wireless communication system, causes the system to carry out a transmission method, the system comprising a source apparatus, a destination apparatus and two or more intermediate apparatuses, said source apparatus being operable to transmit information along a series of links forming a communication path extending from the source apparatus to the destination apparatus via each intermediate apparatus, and each intermediate apparatus being operable to receive information from a previous apparatus along the path and to transmit the received information to a subsequent apparatus along the path, the system having access to a time-frequency format for use in assigning available transmission frequency bandwidth during a sub-frame-period, said format defining a plurality of transmission windows within such a sub-frame-period, each window occupying a different part of that sub-frame-period and having a frequency bandwidth profile within said available transmission frequency bandwidth over its part of that sub-frame-period, each said window being assignable for such a sub-frame-period to one of said apparatuses for use in transmission, the format including a particular transmission window and a subsequent transmission window and the method comprising:
   employing said format for more than one such sub-frame period to transmit information along at least three consecutive said links as a set of successive transmission signals, link by link, each said signal being transmitted in an available transmission window of said sub-frame period;
   the method further comprising:
   prior to said transmission, employing said format:
   to assign the particular transmission window of a first sub-frame period to a first said apparatus, along said consecutive links for transmission of the information to a second said apparatus one link along the path from the first apparatus,
   to assign the subsequent transmission window of the first sub-frame period to the second apparatus for transmission of the information to a third said apparatus one link along the path from the second apparatus, and
   to assign the particular transmission window of a second sub-frame period being the next such sub-frame period after said first sub-frame period to said third apparatus for transmission of the information to a fourth said apparatus one link along the path from the third apparatus.

20. An intermediate apparatus for use in a multi-hop wireless communication system, the system further comprising a source apparatus, at least 1 other intermediate apparatus, and a destination apparatus, said source apparatus being operable to transmit information along a series of links forming a communication path extending from the source apparatus to the destination apparatus via each intermediate apparatus, and each intermediate apparatus being operable to receive information from a previous apparatus along the path and to transmit the received information to a subsequent apparatus along the path, the particular intermediate apparatus comprising:
   a format-accessor operable to access a time-frequency format for use in assigning available transmission frequency bandwidth during a discrete sub-frame period, said format defining a plurality of transmission windows within such sub-frame period, each window occupying a different part of that sub-frame period and having a frequency bandwidth profile within said available transmission frequency bandwidth over its part of that subframe, each said window being assignable for such a sub-frame period to one of said apparatuses for use in transmission, the format including a particular transmission window and a subsequent transmission window; and a transceiver operable to employ said format for more than one such sub-frame period to receive information in the subsequent transmission window of a sub-frame period and to transmit said information in a particular transmission window during the next said sub-frame period such that the information is received from and transmitted to another intermediate apparatus.

21. A method in an intermediate apparatus of a multi-hop wireless communication system, the system further comprising a source apparatus, at least one other intermediate apparatus, and a destination apparatus, said source apparatus being operable to transmit information along a series of links forming a communication path extending from the source apparatus to the destination apparatus via each intermediate apparatus, and each intermediate apparatus being operable to receive information from a previous apparatus along the path and to transmit the received information to a subsequent apparatus along the path, the method comprising:

accessing a time-frequency format for use in assigning available transmission frequency bandwidth during a sub-frame period, said format defining a plurality of transmission windows within such a sub-frame period, each window occupying a different part of that sub-frame period and having a frequency bandwidth profile within said available transmission frequency bandwidth over its part of that sub-frame period, each said window being assignable for such a sub-frame period to one of said apparatuses for use in transmission, the format including a particular transmission window and a subsequent transmission window and the method comprising:

employing said format for more than one such sub-frame period to receive information in an available transmission window of a sub-frame period and to transmit said information in the particular transmission window during the next said sub-frame period such that the information is received from and/or transmitted to another intermediate apparatus.

22. Software embodied on a non-transitory computer-readable medium and operable, when executed on a computing device of an intermediate apparatus of a multi-hop wireless communication system, to cause the intermediate apparatus to carry out a transmission method, the system further comprising a source apparatus, at least one other intermediate apparatus, and a destination apparatus, said source apparatus being operable to transmit information along a series of links forming a communication path extending from the source apparatus to the destination apparatus via each intermediate apparatus, and each intermediate apparatus being operable to receive information from a previous apparatus along the path and to transmit the received information to a subsequent apparatus along the path, the method comprising:

accessing a time-frequency format for use in assigning available transmission frequency bandwidth during a sub-frame period, said format defining a plurality of transmission windows within such sub-frame period, each window occupying a different part of that interval and having a frequency bandwidth profile within said available transmission frequency bandwidth over its part of that sub-frame period, each said window being assignable for such a sub-frame period to one of said apparatuses for use in transmission, the format including a particular transmission window and a subsequent transmission window and the method comprising:

employing said format for more than one such sub-frame period to receive information in an available transmission window of a sub-frame period and to transmit said information in a the particular transmission window during the next said sub-frame period such that the information is received from and/or transmitted to another intermediate apparatus.

* * * * *